Feb. 7, 1928.

W. D. ROOT 1,658,303

AUTOMOBILE SPRING SHACKLE CONNECTION

Filed Dec. 16, 1926

Inventor

*Waldo D. Root*

By *Clarence A. O'Brien*
Attorney

Patented Feb. 7, 1928.

1,658,303

UNITED STATES PATENT OFFICE.

WALDO D. ROOT, OF LA GRANDE, OREGON.

AUTOMOBILE SPRING-SHACKLE CONNECTION.

Application filed December 16, 1926. Serial No. 155,224.

This invention relates to shackle connections for automobile springs and has for its primary object to provide such a connection wherein means is provided to permit of the proper lubrication of the shackle bolt, and this without any liability of the oil leaking from the connection or the entrance of water, dirt, or dust into the connection.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout both of the figures.

Figure 1:
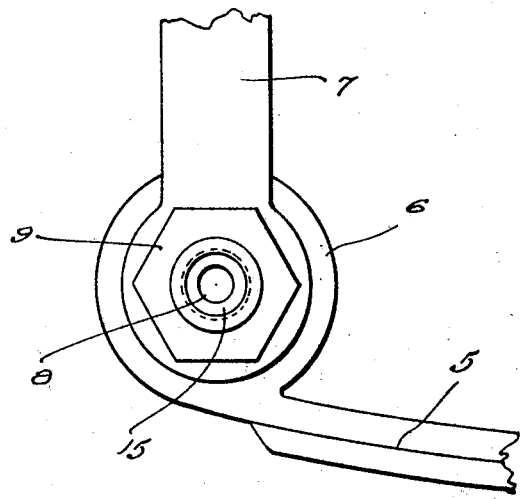
Figure 1 is an end elevation of a spring shackle connection constructed in accordance with the present invention.

Now having particular reference to the drawing, 5 indicates a conventional leaf spring, the end of one of the leaves being formed with the usual cylindrical knuckle 6, while arranged over the ends of this knuckle are the lower plate like ends of the shackle connection links 7—7, which plate ends are provided with openings to facilitate the disposition of a hollow shackle bolt 8 therethrough. The ends of this bolt project through the shackle links 7—7 and are externally threaded for permitting nuts 9—9 to be screwed thereon so as to secure the bolts in proper position between said shackle links.

Figure 2:
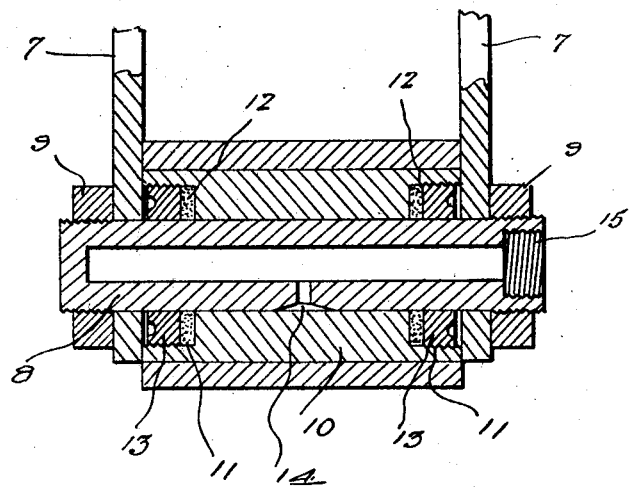
Figure 2 is a longitudinal section thereof.

Arranged around the bolt 8 within the knuckle 6 is a bushing 10, the opposite ends of which are formed with circular sockets 11—11 concentric to said shackle bolt 8, see Figure 2. Arranged within these sockets around said shackle bolts are non-absorbent oil gaskets 12—12, while said sockets are formed at their outer ends with screw threads for receiving circular gasket compression nuts 13—13.

As previously stated, the shackle bolt 8 is hollow and leading from the bore therein centrally of the bushing 10 is an oil passage 14 so as to permit oil or grease that has been injected into the bolt to pass therefrom for lubricating the contacting surfaces of the bushing and said bolt, this oil or grease being prevented from escaping through the ends of the bushing by reason of the nonabsorbent gaskets 12—12.

One end of the bore of the shackle bolt 8 terminates into a large threaded socket 15 for normally receiving a closure plug, and also for permitting of the attachment of a grease or oil gun to the bolt in order that said oil or grease may be forcibly injected therein.

It will thus be seen that I have provided a highly novel, simple, and efficient automobile spring shackle connection that is well adapted for all the purposes heretofore designated, and even though I have herein shown and described the invention as consisting of certain detail structural elements, it is nevertheless to be understood that minor changes may be made therein without affecting the spirit and scope of the appended claim.

Having thus described the invention, what I claim as new and desire to secure by Letters Patent is:—

In an automobile spring vehicle connection wherein one end of the spring is provided with a cylindrical knuckle over the ends of which are disposed certain ends of shackle links having openings therein, a bushing arranged centrally within the knuckle, a hollow shackle bolt extending through the bushing and projecting through the shackle links, nuts upon the ends of the bolt, one end of the bolt being open to provide a lubricant inlet, the inlet end being formed with an enlarged closure plug receiving socket, said bolt being provided with a central discharge opening, the ends of the bushing being formed with enlarged circular sockets concentric with the shackle bolt, the outer end portions of the sockets being threaded, nonabsorbent gaskets arranged in the sockets around the bolt, and gasket compressing nuts threaded in the outer threaded ends of the sockets.

In testimony whereof I affix my signature.

WALDO D. ROOT.